May 19, 1953 M. L. PRIEBE 2,638,635
BUILDING SUITABLE FOR USE AS TOURIST LODGES AND THE LIKE
Filed Jan. 30, 1950
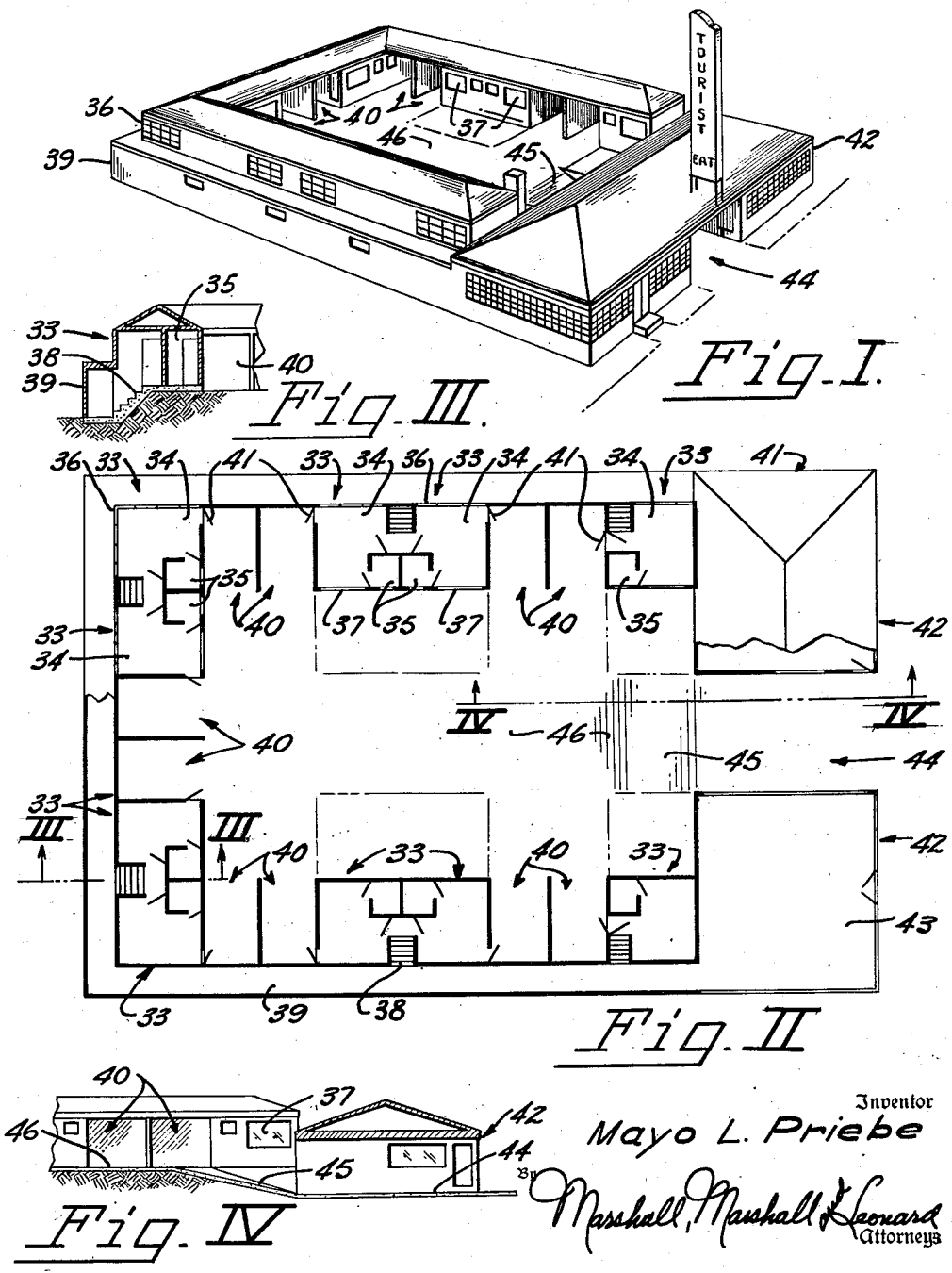
Inventor
Mayo L. Priebe

Patented May 19, 1953

2,638,635

UNITED STATES PATENT OFFICE 2,638,635

BUILDING SUITABLE FOR USE AS TOURIST LODGES AND THE LIKE

Mayo L. Priebe, Rochester, Minn.

Application January 30, 1950, Serial No. 141,303

1 Claim. (Cl. 20—1)

This invention relates to the construction of buildings suitable for use as so-called "tourist lodges" of the type generally affording accommodations to transients traveling by automobile and including such persons as tourists, salesmen and others.

A conventional tourist lodge or tourist court as it is sometimes called, consists in a plurality of units which may be separate from each other, i. e., in the form of individual cabins or may be all parts of the same building, more nearly analogous to rooms in a hotel, the accommodations afforded however usually being slightly more complete than those of a hotel room and often including small kitchenettes, as well as baths and sleeping quarters.

The tourist camp or tourist lodge type of accommodations for persons traveling by automobile possesses several advantages to the traveler. In the first place a tourist lodge can be located near the outskirts of the city because the guests arrive and depart by automobile and need not be located conveniently with respect to railway or bus terminals. Secondly, a tourist lodge always provides space for the traveler's automobile and thus he need not pay an extra fee for the overnight storage in a public garage. Furthermore, a considerably greater feeling of privacy exists in a tourist lodge because each unit is separated from its neighboring units usually by parking space for the occupant's automobile or, at the most, is adjacent its neighboring unit on only one side, there being automobile parking space for the two units between adjacent pairs of units.

Tourist lodges or tourist camps as they are now constructed, however, also have several distinct and inherent disadvantages. The principal disadvantage in the conventional tourist lodge results from the fact that no public meeting room comparable to the lobby of a hotel exists or can exist and if such a space were provided by the addition of an extra building, it would require that the guests leave their cabins and travel through the open varying distances to arrive at this public meeting room. The lack of lobby facilities in the ordinary tourist lodge or tourist camp is particularly distasteful to salesmen who travel by automobile since there is no place in which they can sit to read or converse during the evening hours when business cannot be conducted and no facilities such as cocktail lounges or small stores handling sundries can be reached except by walking from the individual unit to a different or remote building.

Another important disadvantage existing in the standard type of tourist lodge or tourist cabin also results from the remoteness between the "headquarters building" and the living units and has to do with the servicing of the living units. As in a hotel, it is customary for the management of a tourist lodge to service each unit as soon as a previous guest has departed. New linens must be placed in the unit, it must be cleaned and the operation of the equipment therein maintained. Where the individual units are in the form of separate cabins, this requires that the service personnel carry the material from cabin to cabin and in inclement weather risks damage to such things as clean sheets and towels.

It is, therefore, the principal object of this invention to provide buildings so constructed as to afford the advantages of the conventional tourist lodges or tourist camps and also to provide advantages commonly encountered solely in hotels, retaining the more advantageous features of both types of accommodations and eliminating the disadvantageous features of both types of accommodations.

More specifically, it is the object of this invention to provide what might be called an integrated tourist lodge, that is a tourist lodge in which the individual living units each consisting of sleeping quarters, bath and such other facilities as might be deemed necessary and having an automobile parking or storage space thereadjacent are so arranged and designed as to be interconnected by a covered passageway comparable to the corridor of a hotel and connecting the units not only to each other but also to a centrally located public lobby in which the facilities commonly found in a lobby in a hotel can be provided for the convenience and comfort of guests staying in the individual living units.

A still further and more specific object derives from the improvements in construction constituting the invention and by which the principal objects are achieved and consists in a construction providing the necessary elements to achieve the principal objects and in addition, providing for a control over incoming and departing guests hitherto not achieved in tourist lodges. One of the smaller objections to the average tourist lodge which is often voiced by men whose business is traveling by automobile, is the fact that, whereas in a hotel they may pay for their accommodations upon leaving, in tourist lodges it is usually necessary to pay for accommodations before using them because no means exists to control the departure of guests and prevent dishonest guests from leaving without payment. The details of construction necessary to achieve the object of providing the integrated arrangement of the living units and the central public lobby are adapted also to construction in the form of an enclosed unit where arrival and departure is made through a gateway over which the proprietor can retain control.

Other and more specific objects and advantages accruing from buildings constructed in accordance with the instant invention will become apparent from the description which follows and from the drawings in which:

Figure I is a view in perspective of a tourist lodge embodying my invention;

Figure II is a plan view on a slightly enlarged scale of the building shown in Figure I and illustrating the arrangement of the essential elements.

Figure III is a fragmentary detailed elevational view taken substantially along the line III—III in Figure II.

Figure IV is a view generally similar to Figure III but taken along the line IV—IV of Figure II.

A building constructed in accordance with the teachings of the instant invention and in substantially its simplest embodiment may be constructed as shown in Figure I. In this building there exists the elements essential to the achieving of the objects of the invention and arranged in accordance with the teachings of the invention. These elements comprise among others, a plurality of individual living units 33, each of which consists in a room 34 which, of course, may be merely a sleeping room having a bed, dresser and such other furniture as desired, or may be a combination sleeping and sitting room, for example being equipped with so-called "in-a-door" or "Murphy" beds and with such other furniture as the proprietor may desire. Each of the living units 33 also is provided with a bath 35 which may be equipped with shower or bath tub according to the particular desire of the builder and depending upon the space available. With the present popularity of showers, such a room can be very small in size and very compactly constructed.

As shown, the units 33 are interconnected by the passageway 39 and thus connected to a public lobby 43 located in an administration unit 42. Also, the administration unit 32 may comprise not only a lounge and lobby but also other elements such as cigar stand, news stand, public telephones, dining room, lunch stand, or such other conveniences as the proprietor may deem appropriate. The construction illustrated affords to guests the desirable convenience of a modern hotel arrangement whereby all of the needs of the traveler may be satisfied without the necessity for leaving shelter. This is a particular advantage of course in northern climates or in climates subject to large amounts of rainfall where conventional tourist lodge constructions necessitate that the occupants go out of doors in order to avail themselves of any conveniences or shops even though they may be closely adjacent the tourist accommodations. At the same time this construction provides the privacy and separate units found so desirable by automobile travelers and permits salesmen, for example, whose automobiles may contain valuable samples of lines of merchandise, to keep their automobiles overnight in a location closely adjacent their own, not having to fear losses due to pilfering or carelessness on the part of public garage owners whose places of storage often are distance from the traveler's own accommodations.

The building thus is constructed in accordance with the teachings of the instant invention and comprises individual living units 33 which may be arranged in pairs as shown and each of which consists in a room 34, bath 35 and has windows 36 and 37 for light and ventilation. In the construction shown, however, the main level of the living units is raised above that of the surrounding ground as is best shown in Figures III and IV and each living unit is connected by means of a short stair 38 with a common corridor 39. In this instance, however, the corridor 39 extends around the outer perimeter of the living unit 33 rather than being located at the interior as in the building shown in Figure II. Each of the living units 33 is provided with an adjacent car parking space 40 and a door 41 which opens between the room 34 and the car space 40. By reason of the living units 33 being raised above the level of the surrounding land, the windows 36 open over the roof of the corridor 39 thus securing cross ventilation through the living units 33 and providing for a pleasing architectural arrangement.

As shown, the common corridor 39 not only interconnects the living units 33 but also communicates with a main administration building 42 which may contain a lobby 43. In this embodiment of the invention, however, a further novel feature is provided. This feature consists in the automobile entrance 44 and the ramp 45 leading from the car entrance into a center court 46 around which the living units 33 are arranged and through which each occupant drives to reach his respective car parking space 40. The automobile entrance 44 is under the direct observation of and may be provided with means for control by an administrative employee whose office may be located adjacent the car entry in the administration building 42. Thus it is possible for the proprietor to control the incoming and outgoing guests, eliminating the possibility that they may depart without paying and thus obviating the necessity for advance payment for accommodations.

Although the description and drawings disclose and illustrate precise embodiments of this invention, they are not intended to limit the multitudinous number of arrangements of buildings which may be constructed as taught herein. They are, instead, intended merely as examples of the many ways in which the concept of the invention may be embodied or in which the elements necessary to the combination may be arranged. The number of living units chosen depends not upon the nature of the invention but rather upon the needs of the community in which a structure embodying the invention is to be located. The particular architecture employed in the embodiments disclosed is merely illustrative of the many styles of architecture to which integrated tourist lodges embodying the invention are adaptable. The nature of the invention being such that its precise embodiments are less important than the fundamental concept underlying them, its scope and essential elements will be best understood from the claim below.

Having described the invention, I claim:

An integrated tourist lodge consisting in an administrative unit having a lobby, a plurality of individual living units each having sleeping quarters and windows therein for light and ventilation, an automobile storage space adjacent each of and paired with said living units, the pairs being arranged in series, said administrative unit and said series extending along the periphery of and enclosing a court, said windows being on the exterior side of said living units, an enclosed corridor at a level below said living units and closely adjacent to and below the windows in said units intercommunicating between and coupled with said living units and said administrative unit as a unitary structure, and an automobile entrance leading through said administrative unit into said court whereby control over arrivals and departures of automobiles may be maintained.

MAYO L. PRIEBE.

References Cited in the file of this patent

UNITED STATES PATENTS

| Number | Name | Date |
|---|---|---|
| 1,512,975 | Bright | Oct. 28, 1924 |

OTHER REFERENCES

Tourist Court Journal, January 1946, pp. 10, 11, 16 and 17.
American Builder, February 1938, p. 80.
American Builder, March 1940, pp. 76, 77.